April 7, 1970 W. G. BOZSANYI 3,504,419
UNIVERSAL SPRING COMPRESSOR
Filed Oct. 10, 1967
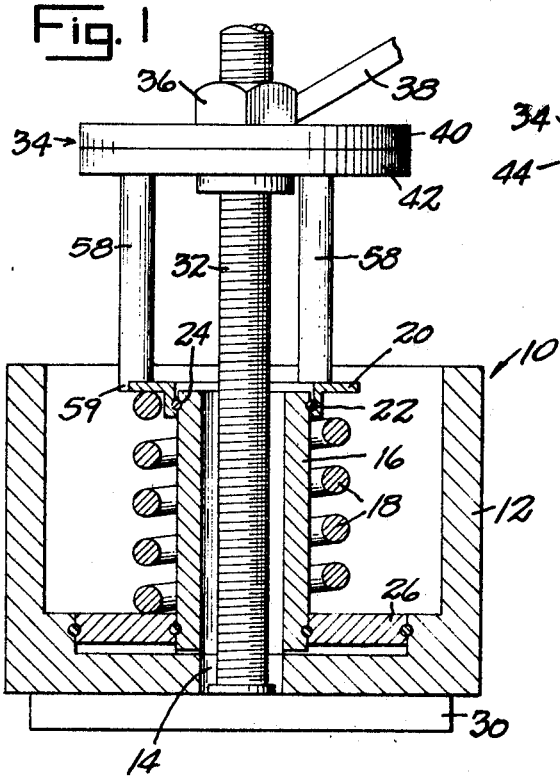
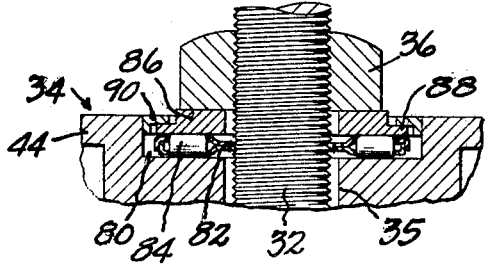
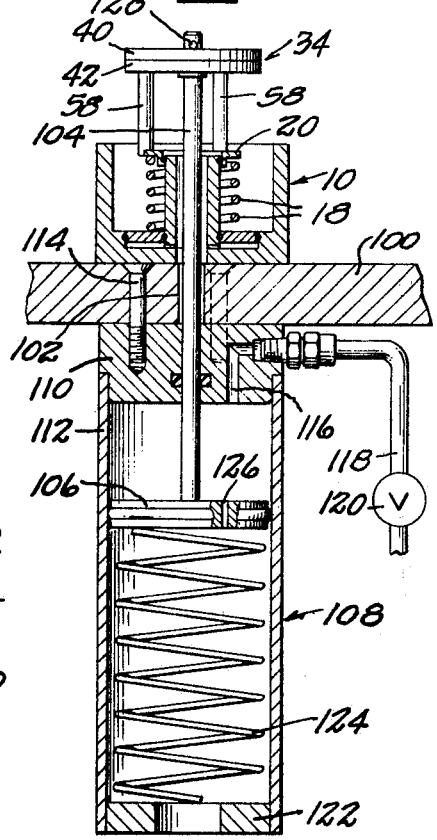
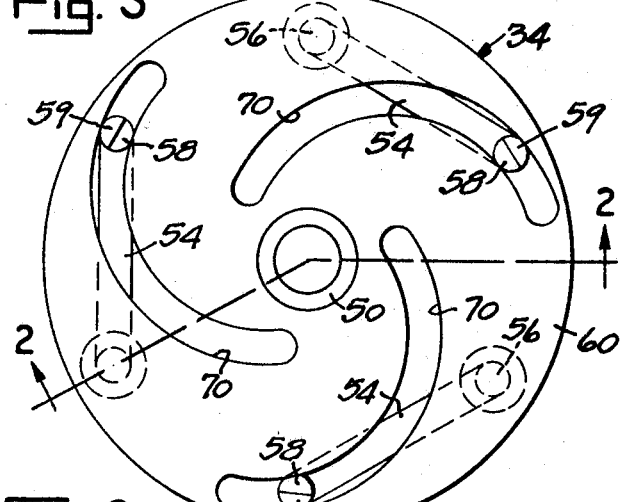
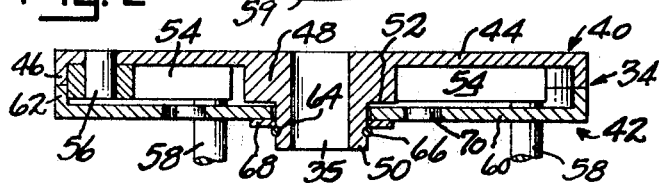
INVENTOR.
WILLIAM G. BOZSANYI
BY *Eugene C. Knoblock*
ATTORNEY United States Patent Office 3,504,419
Patented Apr. 7, 1970

3,504,419
UNIVERSAL SPRING COMPRESSOR
William G. Bozsanyi, South Bend, Ind., assignor of one-half to Eagle T. Shaw, South Bend, Ind.
Filed Oct. 10, 1967, Ser. No. 674,150
Int. Cl. B23p 19/04
U.S. Cl. 29—227
2 Claims

ABSTRACT OF THE DISCLOSURE

A universal spring compressor having a stud extending through the spring and slidably mounting a presser unit engaging the spring and pressed thereagainst by advancing means. The presser unit has a housing with two relatively shiftable parts one of which pivots work engaging members and the other part provides guide surfaces to change the spacing of the work engaging members upon relative movement of said parts.

UNIVERSAL SPRING COMPRESSOR

This invention relates to a universal spring compressor, and more particularly to a spring compressor for use in the assembly and disassembly of mechanical devices containing springs which are normally under compression.

Mechanical devices, such as clutches and automatic transmissions, frequently utilize compact arrangements of parts wherein compressed springs are employed. The assembly and disassembly of such devices requires the use of means for compressing a spring and holding it compressed while other parts are being manipulated to effect the assembly or disassembly. These devices are of different sizes and heretofore it has been necessary to provide a spring compressor for use with each different size of device requiring spring compression to effect assembly or disassembly thereof. One example of the problem which this presents relates to automotive parts. Different makes and different models of automobiles contain clutch or transmission parts of different dimensions. Thus a repair shop must be equipped with a large number of spring compressors, each designed for operation upon a particular clutch or transmission part. The disadvantages of the requirement for separate spring compressors for different sizes of devices include the investment necessary to acquire compressors of a wide range of sizes, and loss of time involved in locating the particular size of compressor which is required for a given job. Another disadvantage is the amount of space which a large stock of spring compressors requires.

It is the primary object of this invention to provide a spring compressor which is universally applicable to devices or mechanisms with a wide range of sizes or dimensions so that a garage or other establishment, wherein spring compressors are used, need have available only a small number of spring compressors in order to cover the full range of uses therefor.

A further object is to provide a device of this character wherein a plurality of spaced pressure exerting members can be bodily shifted to selected spacing and relationship simultaneously in a predetermined manner by a simple maniuplation which can be accomplished manually and without requirement for use of tools.

Other objects will be apparent from the following specification.

In the drawing:

FIG. 1 is a view of a spring compressor in fragmentary side elevation applied to a mechanical device containing a spring to be compressed, which device is illustrated in section;

FIG. 2 is an enlarged sectional view of a part of the spring compressor, taken on a line 2—2 of FIG. 3;

FIG. 3 is an end view of a part of the spring compressor as viewed from the bottom of FIG. 2;

FIG. 4 is a fragmentary axial sectional view of a part of a modified construction of a spring compressor;

FIG. 5 is a view of my new spring compressor associated with fluid pressure actuated operating means.

Referring to the drawing, and particular to FIGS. 1 and 3 which illustrate one embodiment of the invention, the numeral 10 designates a mechanism, such as a clutch or transmission member, which is to be disassembled. The mechanism may include a cup-shaped housing 12 having a central opening 14 in its base aligned and communicating with a central axial tubular part 16. Part 16 is surrounded by a coil spring 18 under compression and retained in place by a ring member 20 which may be of substantially Z-shape in cross-section. Ring member 20 is held in place by a snap locking ring 22 seated removably in a circumferential groove 24 formed in the outer surface of the tubular part 16. The spring 18 is compressed between ring member 20 and an opposite member 26 in the housing 12, and the amount of compression is determined by the position of the ring 20 as it engages and is retained by the snap locking ring 22. It will be apparent that disassembly of the mechanism and installation or removal of the spring 18 can be effected by further compressing the spring 18 so that the ring 20 is moved inwardly to a position exposing the snap locking ring 22 so as to permit the snap locking ring 22 to be removed from the seating groove 24.

My improved spring compressor comprises a base plate 30 which fixedly carries, centrally thereof and perpendicularly thereto, an elongated screw-threaded stud or rod 32 having threads extending from its free end to a point at or adjacent the base 30. The stud 32 is of a diameter smaller than the bore of the smallest tubular part 16 to be accommodated by the tool, and is of a length substantially greater than the axial dimension or depth of the deepest housing 12 of the mechanism to be assembled and disassembled. An adjustable or movable presser unit or assembly 34 has a central passage 35 therein which fits freely but with limited clearance around the stud 32. A feed nut 36, screw-threaded on the stud 32, is adapted to bear against the presser unit 34 to advance the presser unit in a spring-compressing direction, and this feed nut may be provided with a handle 38. If desired, the feed nut 36 may be of the type having its threads interrupted at opposite portions thereof adjacent opposite ends of the threaded bore so as to permit tilting of the nut to free it from the threads of the stud and thereby accommodate rapid movement of the nut upon the stud to and from an operative pressure-exerting position.

The presser unit or assembly has a pair of opposed registering relatively rotatable cup-shaped housing members 40 and 42. Thus member 40 consists of a base disk 44 and a shallow cylindrical marginal wall 46 and a central tubular part 48 whose bore defines the passage 35. Tubular part 48 has an axial dimension greater than the axial dimension of the cylindrical marginal wall 46 and includes a reduced diameter projecting end portion 50 and a circumferential shoulder 52 located in a plane spaced from the plane of the free edge of the marginal wall 46. A plurality of similar rigid arms 54 are pivoted at 56 to the base disk 44 adjacent the outer margin thereof. The axes of the pivot pins 56 are equally spaced from the axis of the housing member 40 and from each other. The inner surfaces of the arms 54 preferably are slidable upon the inner face of the disk 44 as the arms 54 are swung about their pivots. Each arm 54 mounts an elongated presser pin 58 extending perpendicular thereto with its axis spaced a predetermined distance from the axis of the pivot pin 56. At its free end each presser pin 58 has a reduced longitudinal projecting portion 59 which preferably is of semi-circular shape as best seen in FIG. 3.

The cup-shaped presser housing part 42 has a base disk 60 preferably of the same diameter as the disk 44 and a cylindrical marginal wall 62 which preferably registers with the marginal wall 46 of the housing member 40. The outer surfaces of the marginal walls 46 and 62 may be knurled to accommodate gripping thereof if desired. The two housing members 40 and 42 are preferably held assembled in predetermined relation which accommodates relative rotation thereof. In the construction illustrated, the base disk 60 has a central bore which fits rotatably upon the reduced diameter portion 50 of the central tubular part 48 of the member 40 at or adjacent the circumferential shoulder 52. A circumferential groove 64 in reduced diameter tube part 50 receives a snap lock ring 66. A washer 68 is interposed between the disk 60 and the lock ring 66 at a position which so locates the housing member 42 as to permit it to rotate relative to the housing member 40. The base disk 60 is provided with a plurality of similar curved slots 70. The number of slots 70 is the same as the number of the presser pins 58, and the width of the slots is such as to receive snugly but slidably the cylindrical body portions of the presser pins 58. The outer end portions of the slots 70 are located adjacent the outer periphery of the wall 60, the said ends being spaced from the axis of the wall equi-distantly and also being equi-distantly spaced from each other. Similarly the inner ends of each of the slots 70 are spaced similar distances from the axis of the member 60 and equi-distant from one another. The curved shape of each of the elongated slots 70 is the same and may be semi-circular or of any other selected shape.

In the use of the device, the same is first applied to the mechanism whose spring 18 is to be compressed in the manner illustrated in FIG. 1. For this purpose the presser unit or assembly 34 is removed from the stud or rod 32 so as to permit that stud or rod 32 to be inserted through the bore of the tubular part 16 of the mechanism to bring its base 30 into engagement with the closed end of the housing 12 of the mechanism 10. Thereupon the presser unit or assembly 34 is applied over the stud or rod 32 with its presser pins 58 innermost. When the inner ends of the presser pins 58 are at or adjacent the plane of the spring-retaining ring member 20, the cup-shaped housing members 40 and 42 thereof may be relatively rotated to effect the required spacing and arrangement of the presser members 58 to engage and seat upon the ring member 20 in the manner illustrated at the left in FIG. 1, that is, with the reduced projecting portion 59 of each presser pin engaging the outer periphery of the ring member 20 so as to assuredly center and properly position the presser assembly so that each presser pin 58 will bear operatively against the ring 20. It will be observed that the relative rotation of the parts 40 and 42 causes swinging of the arms 54 carrying the presser members 58 by reason of the passage of the presser members 58 through the slots 70. Where the slots 70 are similar in shape and similarly oriented as here shown, and each of the arms 54 are similar to each other and are pivoted at equi-spaced points at the same spacing from the axis, it will be evident that any given angular rotation of housing member 42 relative to housing member 40 will produce exactly the same movement of each presser pin 58 relative to the axis of the presser unit 34. It will be understood, of course, that reasonable mechanical tolerances may be provided or permitted. It will also be understood that in some instances it may be desired to deviate from exact similarity, as in cases where the item being worked upon requires a spacing of the presser members at different distances from an axial position.

After the presser unit 34 has been adjusted to the work piece 20, against which it is to act, the feed nut 36 is advanced on the threaded stud 32 to engage the presser unit 34 and to advance the same axially in a direction to compress the spring 18. When the presser unit 34 has been advanced a distance to move the ring member 20 clear of the snap lock ring 22 and expose that snap lock ring 22 to be gripped and manipulated by a tool for removal thereof, the advance of the feed nut 36 is stopped. The length of the presser members 58 must be such as to permit the introduction of a tool between the open end of the housing mechanism 12 and the housing part 42 of the presser unit 34 for engagement with and gripping of the snap lock ring 22. It will be apparent that after the snap lock ring 22 is removed, releasing rotation of the feed nut 36 will permit expansion of the spring to release its compression, whereupon the compressor may be disassembled and removed from the mechanism to permit the disassembly of the mechanism for replacement or repair of parts thereof.

The use of the device for assembling the mechanism 10 and placing the spring 18 thereof under compression is the reverse of that above described in that parts of the mechanism are first assembled in proper orientation without the snap lock spring 22. Thereupon the compressor mechanism is arranged in the position shown in FIG. 1 and is advanced to compress the spring 18 to such an extent that the lock-receiving groove 24 in the tubular part 16 of mechanism 10 is exposed. Thereupon snap lock ring 22 can be applied to the mechanism and seated in said circumferential groove. Thereupon the compressor mechanism can be moved in spring-pressure-releasing position until ring member 20 engages and is confined by the spring lock 22, whereupon the compressor can be completely disassembled and removed from mechanism 10.

A modified construction of the presser unit 34 to reduce frictional resistance to rotation of the nut 36 during the spring compressing operation of the device is illustrated in FIG. 4 wherein parts similar to those shown in FIGS. 1 to 3 bear the same reference numerals. In this construction, the base disk 44 of the presser unit 34 is provided with a concentric circular recess 80 surrounding the passage 35. Within this recess is positioned a bearing preferably constituting a ring-like retainer 82 carrying a plurality of roller bearings 84 positioned in radial slots thereof which are equiangularly disposed. The rollers 84 are of a diameter greater than the thickness of the bearing retainer 82 and project at both sides thereof so that the rollers bear upon and traverse the surface of the recess 80 while the retainer 82 is held clear of said surface. A ring plate 86 bears upon the rollers 84 and fits with clearance around the stud 32. Ring plate 86 preferably has an outer reduced width marginal flange 88 having clearance with the recess 80 and overlapped by the inner marginal portion of a retainer ring 90 suitably anchored or retained within the recess 80 and preferably having slight clearance with flange 88 to minimize resistance of the retainer ring to rotation of the ring plate 86.

In the use of this construction, when the feed nut 36 is advanced upon the threaded stud or rod 32 to move the presser unit 34 in a direction to compress the spring 18, the feed nut 36 will bear against the ring plate 86. The frictional engagement of the parts 36 and 86 causes them to rotate together and independently of the base disk 44 by virtue of the functioning of the bearing 82, 84. In other words, frictional resistance to rotation of feed nut 36 and ring plate 86 relative to base disk 44 is small and, consequently, upon rotation of the feed nut 36 in spring compressing direction, the device is caused to operate smoothly with negligible application of actuating torque applied to the feed nut 36.

The bearing 82, 84 also provides a guide which enables the operator to detect seating of the spring retainer ring 22 in the snap ring groove 24 during assembling of the device as the spring is compressed if such seating occurs. This guide action is in the nature of a sudden increase in resistance to turning of the nut 36, which normally turns freely.

In some instances, it may be desirable to provide a power operated universal spring compressor, as for use with transmission parts and clutches for trucks and other vehicles which uses very heavy springs. An embodiment of the invention providing such power operation is illustrated in FIG. 5. In this construction a work bench 100 or other support has a bore 102 therein through which extends the rod or stem 104 of a piston 106 of a fluid pressure actuator 108. Actuator 108 preferably includes the end plate 110 of a cylinder 112, which end plates has screw threaded bores to receive mounting screws 114 extending through the bench 100 and has a bore in which stem 104 has a sealed sliding fit. An inlet passage 116 is formed in the end plate 110 and has connection through a suitable fitting with a fluid pressure line 118 provided with a valve 120 and extending to a source of fluid pressure, such as an air compressor (not shown). An apertured end plate 122 is carried by the lower end of the cylinder 112 and supports a coil spring 124 which bears against the bottom of the piston 106 and normally urges the piston to an uppermost position. Piston 106 is preferably provided with a small bleed port 126 in a compressed air unit to permit evacuation of air in the air chamber above the piston as the spring 124 expands from compressed state to elevate the piston stem 104 after the supply of compressed air to the cylinder has been closed at the valve 120 following completion of the manipulation of parts of mechanism 10 for which compression of spring 18 was required.

In the use of the device, the mechanism 10 containing the spring 18, the spring retaining ring 20 and the snap lock ring 24 is mounted upon the bench 100 with the rod or stem 104 passing through the central tubular part 16 of the mechanism. The presser unit or assembly 34 is then applied in place by slide fit of its central tubular part 48 upon the rod or stem 104 with its pressure pins 58 extending downwardly. The device is adjusted for proper position of the pins 58 to engage the ring member 20 of the spring containing mechanism 10 by relative rotation of the members 40 and 42 as previously described. The upper end of the stem 104 removably mounts a pressure transmitting member, such as a screw threaded nut similar to nut 36, or a lock pin 128 extending through a transverse bore at the upper end of the pin as seen in FIG. 5.

When the parts are so assembled, the valve 120 is opened to permit flow of fluid under pressure through line 118 and passage 116 into the cylinder 112 to depress the piston 106 and the stem or rod 104 and thereby lower the pressure unit 34 against the action of the spring 18 to the extent required to release the ring member 20 from encircling relation to the snap lock ring 22. The operator can then remove the snap lock ring 22, whereupon the valve 120 may be closed so that the spring 124 is free to elevate the piston 106, the stem 104 and the pressure member 34 to facilitate removal and replacement of parts of the mechanism 10 upon removal of presser mechanism 34. Following replacement of parts of mechanism 10 and repositioning of presser 10 the fluid pressure member can be again actuated to depress the spring 18 and position the ring 20 clear of groove 24 for insertion of a new snap lock ring 22.

It will be understood that a bleed type piston as here illustrated is not essential in the event the valve 120 is of the type having an open position for fluid pressure supply and a bleed position for bleeding the pressure chamber.

While the preferred embodiments of the invention have been illustrated and described, it will be understood that changes in the construction may be made within the scope of the appended claims without departing from the spirit of the invention.

I claim:
1. A spring compressor comprising:
   a work carrier having an elongated stud projecting therefrom and extending through a work unit including a spring,
   a presser unit slidable on said stud and engageable with said work unit, and
   means cooperating with said stud for advancing said presser unit in spring compressing direction
   said presser unit including:
      a pair of relatively rotatable parts defining a chamber,
      a plurality of spaced projecting work-engaging members pivoted in predetermined spaced relation to one of said chamber-defining parts and
      automatic centering means for selectively spacing said members relative to said stud and including a plurality of spaced curved elongated slots in the other chamber-defining part
      said pivoted work-engaging members each having a part thereof in said chamber and a presser pin carried by the chamber-contained part and projecting through one of said slots.

2. A spring compressor as defined in claim 1 wherein:
   said relatively rotatable chamber-defining parts are cup-shaped,
   said spaced curved elongated slots therein being similar, equispaced and similarly oriented,
   said work-engaging members being similar and pivoted on axes equispaced from one another and from the axis of said chamber.

References Cited
UNITED STATES PATENTS

| | | | |
|---|---|---|---|
| 1,506,886 | 9/1924 | Clay | 29—252 |
| 2,373,975 | 4/1945 | Plumeau | 29—252 X |
| 3,078,556 | 2/1963 | Carroll | 29—226 |
| 3,178,808 | 4/1965 | Pendley | 29—227 |
| 3,368,266 | 2/1968 | Shultz. | |

ROBERT C. RIORDON, Primary Examiner

J. C. PETERS, Assistant Examiner